June 9, 1936. H. VON LITTROW ET AL 2,043,637
POWER DRIVEN WINDOW CLEANER
Filed Feb. 23, 1933 2 Sheets-Sheet 1
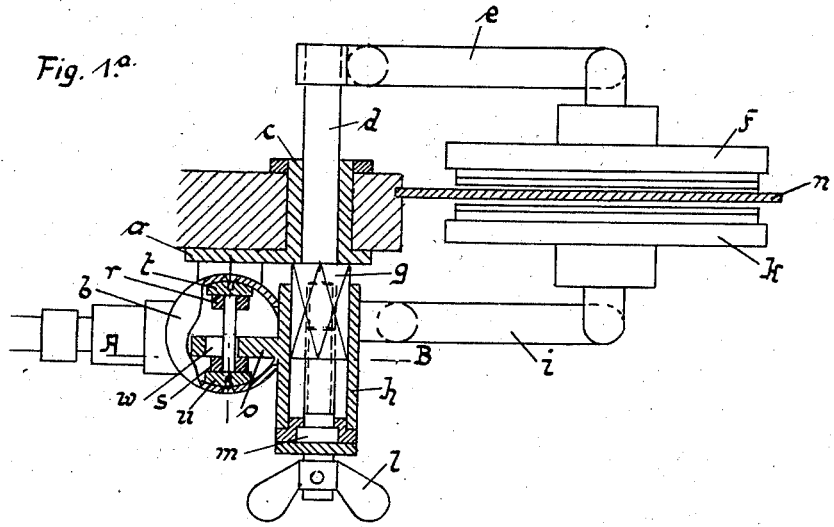
Fig. 1.ª
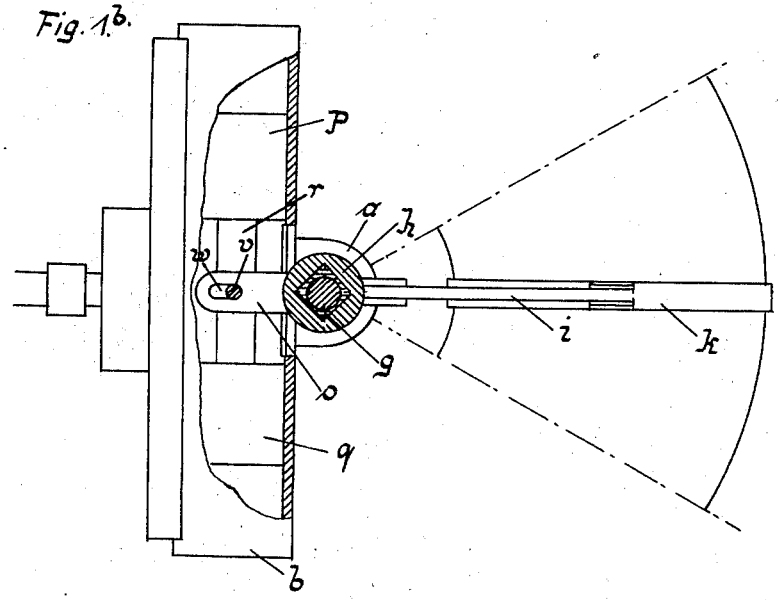
Fig. 1.ᵇ
Inventors:-
Hans von Littrow
Franz Hermann Zehl
by Brown & Seward
attorneys June 9, 1936.   H. VON LITTROW ET AL   2,043,637
POWER DRIVEN WINDOW CLEANER
Filed Feb. 23, 1933   2 Sheets-Sheet 2
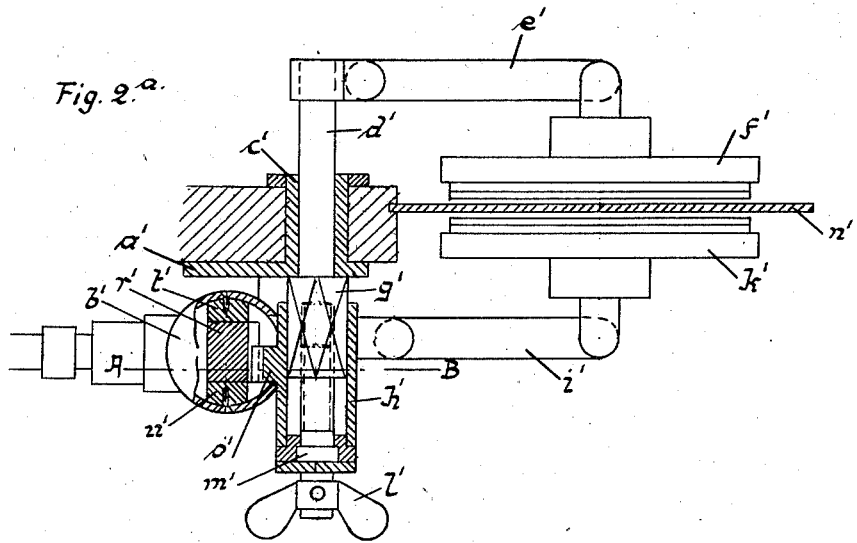
Fig. 2ª.
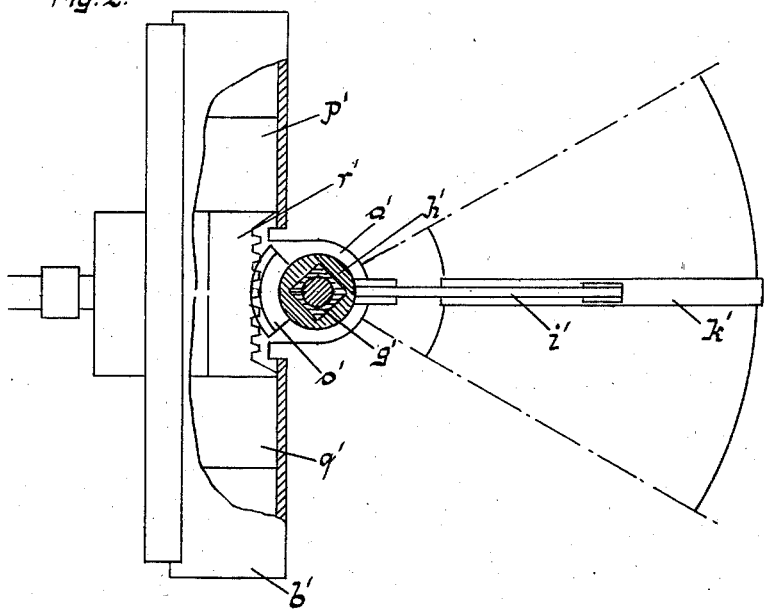
Fig. 2ᵇ.
Inventors:-
Hans von Littrow
Franz Hermann Zehl
by Browne Seward
attorneys

UNITED STATES PATENT OFFICE 2,043,637

POWER DRIVEN WINDOW CLEANER

Hans von Littrow, Chemnitz, and Franz Hermann Zehl, Wiesbaden-Biebrich-on-the-Rhine, Germany Application February 23, 1933, Serial No. 657,950 In Canada February 25, 1932

6 Claims. (Cl. 15—256)

The known oscillating window-cleaners or wipers used with trains, trams, motor-cars or the like for removing ice, snow or frost from the window-panes which are frequently covered therewith on both sides are, to accomplish their purpose, made to fit both sides and in such a manner that the boxes containing the cleaners are arranged to be adjustable in an axial direction. In this connection there are used cleaner-boxes, which in a known manner contain both rubber wiping elements and cutting teeth, the latter being resiliently mounted on a rubber rod. The action of these cleaners or wipers is such that when a small pressure is exerted on the cleaner-box only the rubber wiping elements will bear against the window-panes, whereas by a stronger pressure the elastically mounted teeth also will be pressed on both sides against the pane. Said cleaner-boxes may be pressed with any desired force against the pane without any bending action being exerted on the latter so long as the pressure on both sides is equal. These boxes will always rest equally firmly against the pane and will also during their oscillation make movements in an axial direction resulting from the fact that the panes, as is very often the case, will not be seated exactly vertically but obliquely to the axle of the cleaner, and also from the fact that the panes will follow the natural distortions of the vehicle-body. The axle will respond to all these movements of the cleaner-boxes and must consequently be able to move to and fro in a longitudinal direction within its bearing. Such known cleaners or wipers operated by hand, although capable to a certain extent of removing the ice from the window-panes in a satisfactory manner, nevertheless require a repetition of their use within short intervals and consequently greatly tire the hand of the driver, because the removal of ice requires the user to exert a strong pressure on the teeth of the cleaner-boxes. Now to move said cleaners or wipers by compressed air, vacuum, steam or electric current, generally already at the driver's disposal on practically all locomotives, electric cars and heavy motor-cars for braking purposes, will mean greater ease for the driver, as the latter, not only when the windows are covered with ice, but also in case of snow and rain, will have a clear and free view of the track and the signals without being in any way distracted by having to clean the windows by hand, which advantage will of course also be in favor of the security of service.

As a driving means any desired motor having a to and fro movement can be used. As, however, the axle of the cleaner or wiper must, as above stated, have a free play in an axial direction, the means for transmitting the power to said axle must be arranged to permit a longitudinal displacement.

Since, when the movement of the wipers or cleaners takes place by hand, the touch of the driver will effect the necessary axial movements, in cases where the cleaners are power-driven the transmission of the power to the wiper-boxes must be adapted to take place with a similarly sensitive side-displacement. In this case it will not be sufficient to arrange the wiper-arms, yieldingly on an axle without any axial movability, because then the wiper-boxes—for instance if the window-pane is seated in an oblique or strongly bent position—would on that side of the pane, on which the yielding arm happens to be under a comparatively small tension, only lie very softly against the pane, so that the teeth would pass over the ice without removing the same, whereas on the other side, on which the yielding arm happens to be under greater tension, the wiper-box would press so hard against the pane, that the teeth would catch hold of too much ice and thus be apt to stick in the same and not fulfill their scraping duty. Furthermore with such an arrangement both sides of the window-pane would alternately be subjected to bending by the pressure of the yielding arms, which, in order to clean properly, would have to be made very strong. Consequently the axle itself must be arranged to undergo an axial displacement in relation to the pane, in order that the wiper-boxes, firmly pressed against the pane during the removal of ice, are so to say guided by the pane itself.

This is obtained according to the present invention by means arranged to move the cleaner or that portion of the same which receives the driving power and transforms said power into the swinging movement of the window-cleaner, approximately vertically to the plane of movement of the wiper members moving to and fro.

On the annexed drawings there are shown by way of example two modes of construction containing the means for obtaining this purpose, wherein for driving power a machine, having two rigidly connected pistons moving to and fro is employed.

Figs. 1a and 1b show one mode of construction, of which Fig. 1a is a top-view partly in section and Fig. 1b a section according to line A—B of Fig. 1a.

Figs. 2a and 2b show another mode of construction, Fig. 2a being a top view partly in section, and Fig. 2b a section on the line A—B of Fig. 2a.

To the ground-plate a there are fixed the cylinder b and the bearing c, the latter passing through the wall of the vehicle and receiving the shaft d. On the one end of the latter there is fixed the outer cleaner-arm e, carrying the cleaner-box f. On the other end the shaft d is made to form a quadrangular pin g, on which the sleeve h, being on its inner side correspondingly shaped to form a quadrangular hole, can be positioned. To said sleeve h there is fixed the inner cleaner-arm i, carrying the cleaner-box k. On the outer end of the sleeve h there is firmly mounted a wing-screw l by means of the shoulder m thereof, which protrudes into a hollow thread cut into the quadrangular part g. In the position shown—which is the position of rest—the wing-screw l is entirely turned to the left, in which case the quadrangular part g abuts against the plate a, and the sleeve h with the lever o against the cylinder; the cleaner-boxes f and k are in their extreme position and stand off the pane n, which greatly helps to save them. If only rain-drops, snow or any moist deposit is to be removed from the glass the wing-screw is turned so much towards the right that the rubber wipers of the cleaner-boxes slightly touch the glass n. If, however, hard snow- or ice-crusts are to be removed, the wing-screw l is still further turned towards the right, until also the cutting teeth contained in the cleaner-boxes will come to lie against the glass. On the sleeve h there is seated opposite to the cleaner arm i a lever o protruding into the cylinder b through an opening in the middle of the cylinder-wall. Within the cylinder the two pistons p and q, rigidly fixed to each other by the rods r and s, are moved up and down by the driving fluid being alternately fed above the piston p and below the piston q. By means of the guiding pieces t and u inserted at opposite sides of the cylinder, the rods r and s are protected against turning. In the rods r and s a pin v is mounted passing through the slot w of the lever o for actuating said lever.

Said lever o is narrower than the length of the pin v to an extent necessary for obtaining a free longitudinal movement of the axle of the cleaner. If now before starting the cleaner, the wing-screw l is turned towards the right until the cleaner-boxes f and k rest against the pane n, the quadrangular part g will correspondingly withdraw from the plate a, against which it abuts during the position of rest, and the shaft d will be able to easily follow all movements, which the cleaner-boxes f and k make in an axial direction, owing to their even and tight fit to the widow-pane, which follows the distortions of the vehicle-body and sometimes is even in an oblique position, whereas said shaft will be turned in either direction by the lever o, sliding axially on the bolt v within the slot w.

In the modified form shown in Figs. 2a and 2b, the same arrangement of the axle, the sleeve and the cleaner is made use of. The working pistons p' and q' are in this case connected by only one rod r', being made to form a toothed rod and being ensured by the guiding pieces t' and u' against an undesired turning motion, in order to also in this construction facilitate the axial sliding movement of the teeth on each other and to avoid a jamming, which would take place on a wear of the teeth. On the sleeve h' there is arranged a toothed segment o' coacting with the toothed rod r', the teeth of which segment being narrower than the teeth of the toothed rod r' to an extent necessary for obtaining a free longitudinal movement of the axle of the cleaner. On an up and down movement of the pistons the teeth of the toothed segment o' will slide to and fro on the teeth of the toothed rod r'. Thus it is also obtained that the free play of the axle in its bearing is maintained and that the cleaners or wipers are always able to adapt themselves to an equally tight position against the window-pane.

What we claim is:

1. A window cleaner comprising window cleaning means on each side of the window, driving means for oscillating said cleaning means, manually operable adjusting means to move the window cleaning means towards or away from the window, power transmitting means between said driving means and said adjusting means, said power transmitting means, said adjusting means, and said window cleaning means being capable of free movement with respect to said driving means in a direction approximately vertical to the plane of the window.

2. In a power operated window cleaner, driving means, a shaft driven thereby freely movable axially in a direction approximately vertical to the plane of the window, and window cleaning means on each side of the window mounted on said shaft and adjustable in a direction approximately vertical to the window with respect to each other.

3. In a power operated widow cleaner, driving means, window cleaning means on each side of the window adjustable in a direction approximately vertical to the window, and connecting means between said driving means and said cleaning means freely movable in a direction approximately vertical to the plane of the window.

4. In a power operated window cleaner, driving means, a bearing, a shaft sliding therethrough and passing through the plane of the window, a plurality of window cleaning means on opposite sides of the window fixed against rotation with respect to one another and carried on said shaft, means for adjusting said cleaning means in a direction approximately vertical to the plane of the window and connecting means movable in a like direction between said driving means and said cleaning means.

5. In a power operated window cleaner, a driven reciprocating rack, a bearing, a shaft sliding therethrough and passing through the plane of the window, a plurality of window cleaning means on opposite sides of the window fixed against rotation with respect to one another and carried on said shaft, means for adjusting said cleaning means in a direction approximately vertical to the plane of the window, and a segment movable in a like direction fixed against rotation with respect to said shaft and cooperatively engaged with said reciprocating rack.

6. In a window cleaner, a cylinder containing two pistons, spaced bars connecting said pistons, a hollow rotatable and longitudinally slidable member, a cleaning means carried thereby, a slotted arm also carried thereby, a pin connecting said bars and passing through the slot in said arm, the distance between said bars being appreciably greater than said thickness of the arm on the hollow member.

HANS VON LITTROW.
FRANZ HERMANN ZEHL.

CERTIFICATE OF CORRECTION.

Patent No. 2,043,637.  June 9, 1936.

HANS von LITTROW, ET AL.

It is hereby certified that error appears in the printed specification of the above numbered patent requiring correction as follows; Page 2, second column, line 34, claim 3, for the word "widow" read window; and line 71, claim 6, for "said" read the; and same line, for "the" first occurrence, read said; and that the said Letters Patent should be read with these corrections therein that the same may conform to the record of the case in the Patent Office.

Signed and sealed this 11th day of August, A. D. 1936.

Henry Van Arsdale (Seal)  Acting Commissioner of Patents.